Dec. 21, 1926.  
H. A. BERG  
1,611,407  
APPARATUS FOR INDICATING AND RECORDING MATERIAL LEVEL IN BLAST  
FURNACES OR THE LIKE  
Filed July 2, 1925 5 Sheets-Sheet 1

INVENTOR:  
HAKON A. BERG  
BY  
ATTORNEY.

Dec. 21, 1926.
H. A. BERG
APPARATUS FOR INDICATING AND RECORDING MATERIAL LEVEL IN BLAST FURNACES OR THE LIKE
Filed July 2, 1925
1,611,407
5 Sheets-Sheet 5

INVENTOR:
HAKON A. BERG
BY
ATTORNEY.

Patented Dec. 21, 1926.

1,611,407

UNITED STATES PATENT OFFICE.

HAKON A. BERG, OF CLEVELAND, OHIO.

APPARATUS FOR INDICATING AND RECORDING MATERIAL LEVEL IN BLAST FURNACES OR THE LIKE.

Application filed July 2, 1925. Serial No. 41,017.

My invention relates to apparatus for recording and indicating material level in containers, such as blast furnaces and the like.

The object of the invention is to provide an apparatus which will automatically indicate at given periods of time the stock or material level in such a container and also to record same.

The invention is particularly applicable for use in connection with blast furnaces. As is well known to those skilled in the blast furnace art, it is necessary, for the proper operation of the furnace, to know what the stock or material level is from time to time in order that the proper amount of charge may be maintained. I have also found that it is desirable that means be provided for making a continuous record of such stock and material level in order that the superintendent or other person having general charge of the operation of such furnace, may examine such a record and determine whether or not the plant has been properly operated during a given period of time.

My said invention consists of means hereinafter fully described and particularly set forth in the claims.

More specifically, the invention as illustrated consists of an elongated weight, preferably in the form of a bar, suspended from a cable and having access to the upper portion of the container. This bar is allowed, at intervals, to automatically descend into the furnace until such descent is interrupted by the upper level of the charge or contents and then automatically withdrawn. Such interruption in its descent removes the tension in the cable produced by the normally depending weight, and automatically effects the operation of a motor which winds up the cable, raises the cable until it reaches its uppermost position, at which time the motor automatically stops.

Operatively connected with and controlled by this cable is an indicator cooperating with a dial which indicates the plane at which the lower end of the weight engages the upper level of the charge, and connected with this cable is also a recording device which makes a continuous record of the successive level indications.

The annexed drawings and the following description set forth in detail certain means embodying my invention, the disclosed means, however, constituting but one of the various mechanical forms in which the principle of the invention may be employed.

In said annexed drawings:

Fig. 8$^A$ and Fig. 8$^B$ represent, respectively, detail views taken upon the planes indicated by lines VIII$^A$—VIII$^A$ and VIII$^B$—VIII$^B$ respectively in Fig. 9.

Fig. 14 represents upon an enlarged scale a fragmentary section taken upon the same plane upon which Fig. 13 is taken.

I have illustrated, in the drawings, my invention as particularly applied to determining the level of material or stock of a blast furnace.

Figure 1:
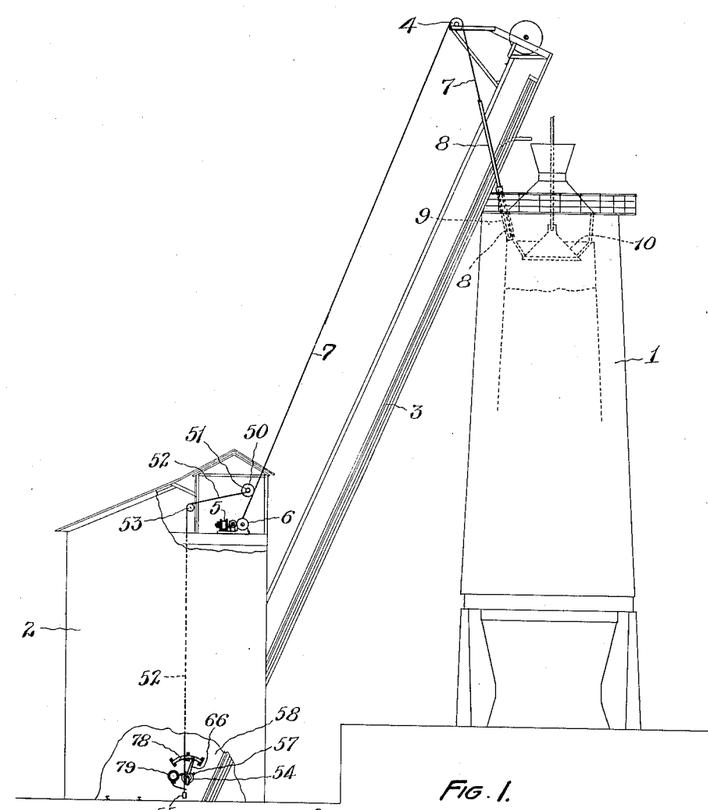
Figure 1 represents a diagrammatic side elevation of a blast furnace equipped with an indicating and recording device of the above-described character, part of the building which is shown to house the indicating and recording device being broken away to show the location of parts in the interior thereof.

In such illustrated embodiment, 1 represents a blast furnace of the usual type. At a suitable location at one side of said furnace is the stock house 2 which supports the skip-bridge 3 at the upper end of which is mounted a sheave 4. In this building or housing 2 is a motor 5 which operates a drum 6 around which one end portion of a primary cable 7 is wound. The other end portion of this cable passes over the sheave 4, depends and has attached thereto a weight 8 which is preferably in the form of a long steel bar, as shown. This bar is positioned and capable of sliding through a tube 9 which passes through the top of the furnace as shown and outside of the charging bell 10.

It will be noted, therefore, that by unwinding the cable, the weight or bar 8 may pass down into the top portion of the furnace until its descent is arrested by the upper level of the contents of the furnace.

When the weight is depending and out of contact with such level, the cable 7 is in tension, but when the lower end of the bar strikes or contacts with such material and its descent is arrested, such tension of the cable will be substantially removed.

Figures 2, 3, 4, 20:
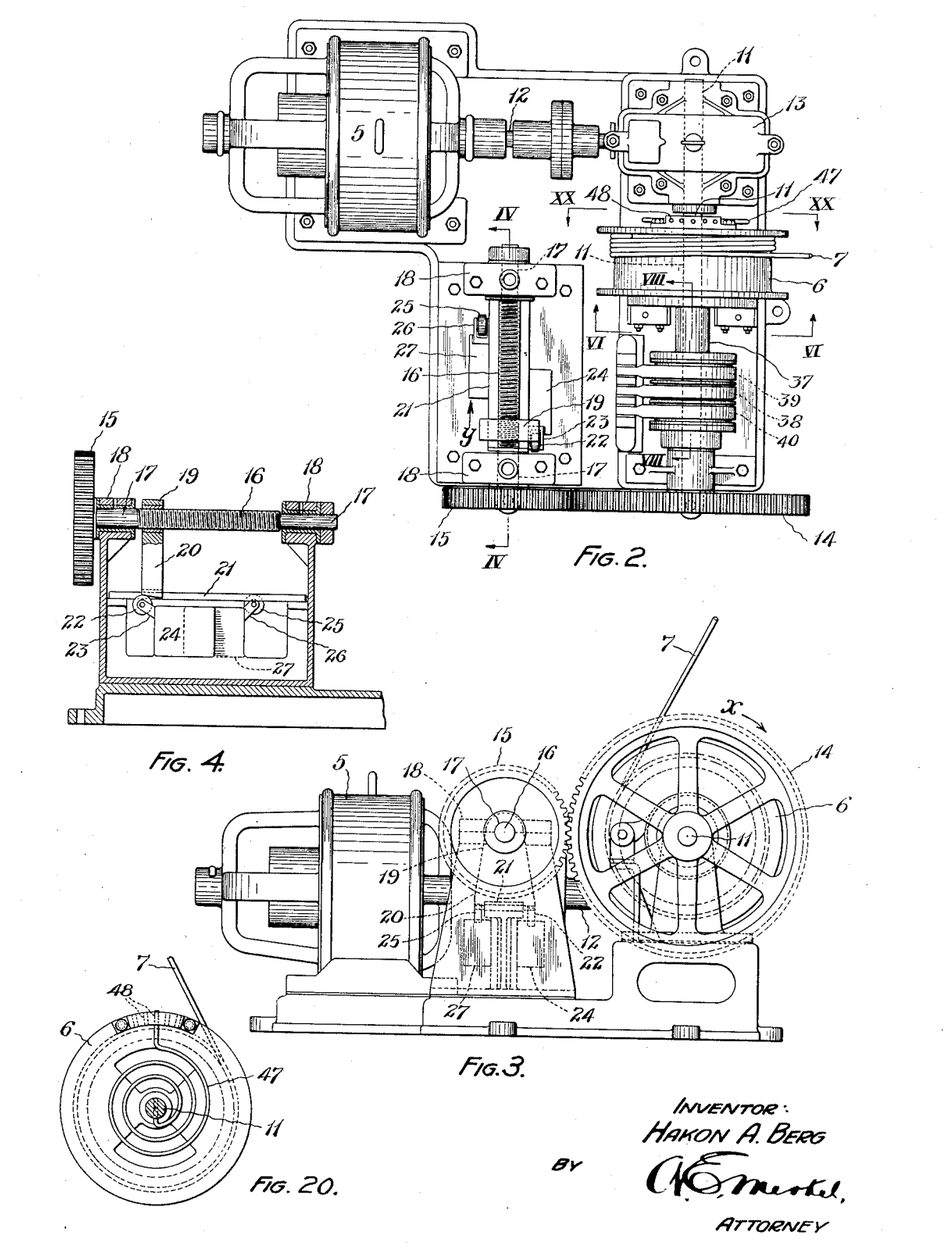
Fig. 2 represents a plan of the drum for winding and unwinding the primary cable together with a motor for actuating same and the connected parts
Fig. 3 represents an end elevation of the parts shown in Fig. 2.
Fig. 4 represents a section taken upon the plane indicated by line IV—IV, in Fig. 2, and viewed in the direction indicated by the arrows.
Fig. 20 represents a section taken upon the plane indicated by line XX—XX in Fig. 2.

The drum 6, Fig. 2, is loosely mounted upon a shaft 11 which is driven by the motor shaft 12 through the medium of a suitable gear box 13. This motor is of the direct current type and capable of reversal.

The one end of the shaft 11 has secured thereto a gear 14 which meshes with a gear 15 secured to a screw 16. This screw is provided with suitable journals 17 mounted in bearing boxes 18, and has mounted thereon a nut 19 having a lower extension 20 engaging a groove 21 formed in a fixed part of the frame whereby rotation of the nut is prevented. The rotation of the screw will therefore cause the nut to travel along same, as will be understood.

Projecting into this groove is an antifrictional roller 22 mounted upon an arm 23 of a limit switch 24 adapted when actuated, to break the motor circuit and stop the motor as will hereinafter be described. Also projecting into this groove is a second antifrictional roller 25 mounted upon an arm 26 of a second limit switch 27, which, when actuated, also breaks the motor circuit, as will also be hereinafter described.

The above parts are so arranged and coordinated that when the motor is driven so as to rotate the drum in the direction indicated by the arrow $x$ in Fig. 3, nut 19 will travel in the direction indicated by arrow $y$ in Fig. 2.

Figures 5, 8:
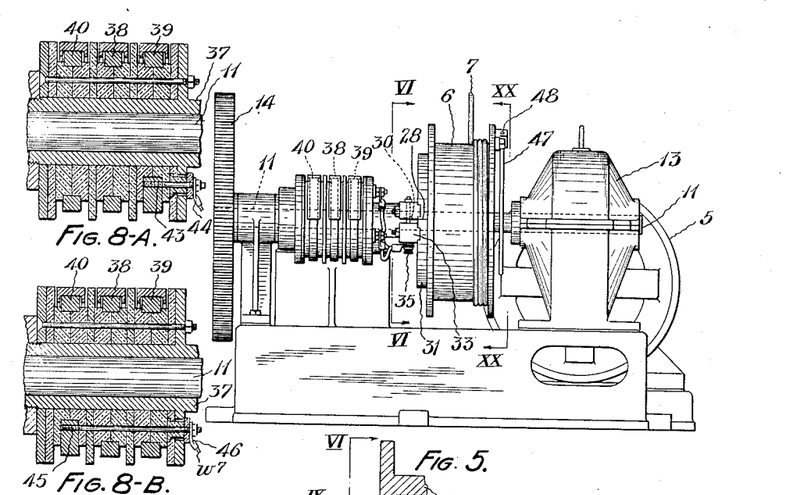
Fig. 5 represents a side elevation of the parts shown in Fig. 2.
Fig. 8 represents a section taken upon the plane indicated by line VIII—VIII, Fig. 2, and viewed in the direction indicated by the arrows.
Figure 6:
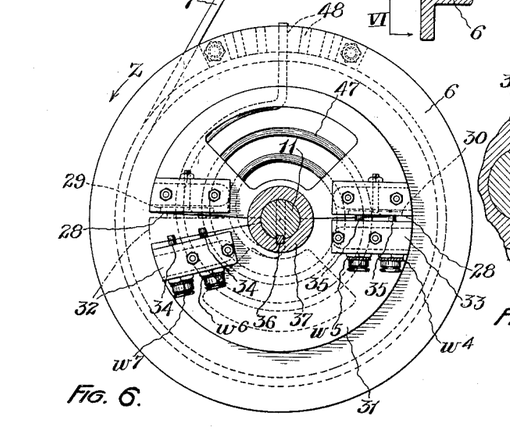
Fig. 6 represents upon an enlarged scale a section taken upon the plane indicated by line VI—VI in Fig. 5.
Figure 7:
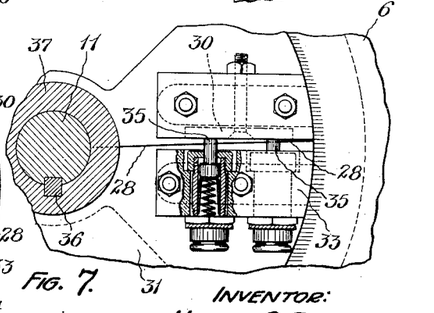
Fig. 7 represents a section similar to that of Fig. 6 upon a still further enlarged scale and showing an additional section of a detail portion thereof.
Figure 8:
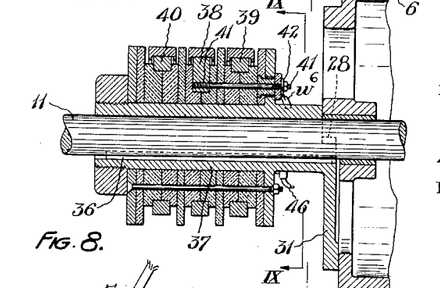

Upon one face of the drum, Figs. 6 and 8, are two shoulders 28—28 located upon opposite sides of the drum's axis. Each of these shoulders is provided with a connector bar, 29 and 30 respectively, which are suitably insulated from the drum face, Figs. 6 and 7. Beneath these shoulders is a segmental member 31 which has affixed thereto two blocks, 32 and 33 respectively, and in each of these blocks and supported thereon and suitably insulated therefrom are two electrical contact terminals 34—34 and 35—35 respectively. These terminals form parts of the motor circuit, as will be hereinafter described.

The upper face of member 31 is formed by two planes as shown in Fig. 6, angularly related to each other, so that the contacts 34—34 may be disengaged from the connector bar 29 while contact members 35—35 are in engagement with the connector bar 30.

Figure 9:
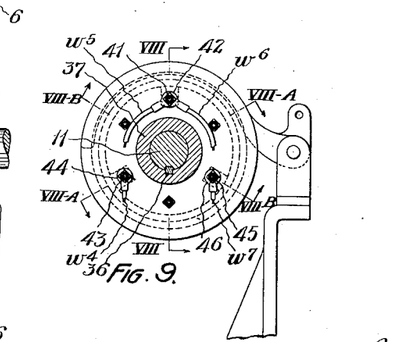
Fig. 9 represents a section taken upon the plane indicated by line IX—IX, Fig. 8, and viewed in the direction indicated by the arrows.

The drum 6 is loosely mounted upon the shaft 11 as shown in Fig. 8, but the member 31 is secured thereto, as also shown in said figure, by means of a key 36. This member 31 is furthermore formed with a cylindrical axial extension 37, Fig. 8, upon which are mounted three collector rings 38, 39 and 40, forming parts of the motor circuit. Ring 38 is connected by means of a suitably insulated bolt 41 with a binding post 42, Fig. 9. Ring 39 is connected by means of a bolt 43 with a binding post 44. Ring 40 is connected by means of a bolt 45 with a binding post 46.

To the other face of the drum 6 is secured one end of a spiral spring 47, the other end of which is secured to shaft 11, as shown in Figs. 6 and 20. This spring is normally in tension, its force being directed in such a manner as to tend to move the drum 6 upon its axis, in the direction indicated by arrow $z$, Fig. 6, so as to bring the contact members 34—34 into engagement with the connector bar 29.

The tension of this spring may be varied by varying the location of one end thereof, and for this purpose a multiplicity of radial holes 48 are provided in the drum face, into any one of which the said spring may be inserted and secured.

There is sufficient inertia in the drum and connected parts to maintain the elevated position of the rod 8.

Let it be assumed now that the weight 8 is in its uppermost position. By now actuating the motor so as to rotate the shaft 11 in the direction indicated by the previously mentioned arrow $x$ in Fig. 3, such inertia is neutralized and the weight of the contact member or bar 8 will rotate the drum in the same direction, but during such rotation the gravitational force of such descending weight is sufficient to keep the contact members 34—34 out of engagement with the connector bar 29 and cause the contact members 35—35 to remain in contact with the connector bar 30, so long as such force is applied as evidenced by a state of tension in the cable. The drum is hence driven by the descending bar 8, in said described direction.

As soon, however, as the contact bar 8 strikes the top of the charge and the said tension is removed from the cable, the spring 47 retards the drum and permits it to lag so as to reverse the position of the contact members 34—34 and 35—35, causing the latter members to disengage connector bar 30, and members 34—34 to engage bar 29.

Let it be observed at this point, that during such described action the nut 19 releases the limit switch 24 and travels toward limit switch 27 which is normally closed.

Under normal conditions, however, such travel does not cause it to reach and actuate said switch 27, as will be further described.

Figure 21:
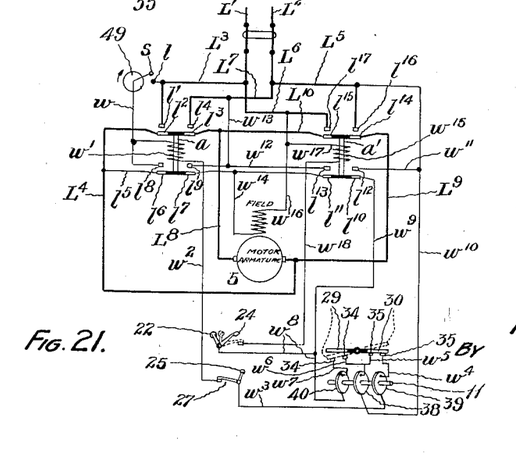
Fig. 21 represents a wiring diagram of the electrical apparatus employed in the device.

The actuation of the motor to start is effected periodically by means of a rotating switch 49, shown diagrammatically in Fig. 21, and which may be of any suitable construction and is driven continuously by a suitable motor (not shown).

The switch periodically makes and breaks the motor circuit and hence periodically starts the motor as will now be explained.

Referring to the wiring diagram, Fig. 21, $L'$ and $L^2$ are the main power lines. Line $L'$ is connected by a wire $L^3$ with a terminal contact member $l$, which is periodically engaged by the terminal $s$ of the rotary switch 49. The line $L^3$ also is connected with a terminal $l'$ which is adapted to be engaged by a terminal $l^2$ mounted upon an armature $a$ of a magnetic switch which also carries a terminal $l^3$ adapted to engage a terminal $l^4$. The terminal $l^2$ is connected by means of wires $L^4$ and $l^5$ with another contact terminal $l^6$ also mounted upon said armature. This armature also carries a terminal $l^7$, the latter and $l^6$ adapted to engage terminals $l^9$ and $l^8$. A wire $w$ connects the switch 49 with terminal $l^8$ and with one end of a magnetic coil $w'$ which when energized actuates the armature $a$. The other end of this coil is connected with one terminal of the limit switch 37 by a wire $w^2$. The other end of this switch is connected by a wire $w^3$ with the collector ring 39. This ring is in turn connected by a wire $w^4$ with one of the contact members 35, the other member 35 being connected by means of a wire $w^5$ with the collector ring 38. This ring is also connected by a wire $w^6$ with one contact member 34. The other contact member 34 is connected by wire $w^7$ with the collector ring 40 which is in turn connected with a wire $w^8$.

This latter wire is connected with one terminal of the limit switch 24 and is itself connected by wire $w^9$ with one contact terminal $l^{10}$ of a second magnetic switch armature $a'$.

The collector ring 38 is connected by wires $w^{10}$ and $L^5$ with the other main power line $L^2$ as shown.

The armature $a'$ carries a second contact terminal $l^{11}$ and the two terminals $l^{10}$ and $l^{11}$ are adapted to engage two terminals $l^{12}$ and $l^{13}$ respectively. Terminal $l^{12}$ is connected by wire $w^{11}$ with the wire $w^{10}$ and terminal $l^{13}$ is connected by wire $w^{12}$ with the terminal $l^9$. Wire $w^{12}$ is connected with the line $L^2$ by wires $L^7$ and $w^{13}$.

The upper end of the armature $a'$ carries two terminals $l^{14}$ and $l^{15}$ which are adapted to engage terminals $l^{16}$ and $l^{17}$ respectively. Terminal $l^{16}$ is connected with the line $L^2$ by means of wire $L^5$ and terminal $l^{17}$ is connected with line $L'$ by wire $L^6$.

The wire $w^{14}$ connects with one end of the field of the motor and with the terminals $l^7$ and $l^{11}$, the other end of such field being connected by a wire $w^{16}$ with wire $L^6$.

Terminals $l^3$ and $l^{15}$ are connected by wire $L^{10}$ and the latter is connected with one terminal of the motor armature by wire $L^8$, the other terminal of the latter being connected with armature terminal $l^{14}$ by means of wire $L^9$ and with wire $L^4$.

The coil $w^{15}$ which actuates armatures $a'$ is connected at one end with wire $w^{16}$ by means of wire $w^{17}$ and at the other with the other terminal of limit switch 24 by wire $w^{18}$.

The limit switches 24 and 27 are normally closed, that is, they are closed when not engaged by the nut 20. It will also be noted from the above-described arrangement of the circuits that when the contact between the terminals $s$ and $l$ is broken, no current flows through the motor and the armatures $a$ and $a'$ are in a position in which no contact is made by the contact members carried thereby.

Let it now be assumed that the rod is in its uppermost position, the contacts $s$ and $l$ are out of contact, and the motor hence stationary. Under these conditions, the contact members 35—35 will, as previously described, be in engagement with the connector bar 30 and the contact members 34—34 out of engagement with the other connector bar 29 as shown in full lines in Figs. 6 and 21. Let it also be assumed that the switch 49 is continuously rotating at a given predetermined speed. At predetermined intervals, therefore, contact will be made between the terminals $s$ and $l$. When this occurs, a circuit will be established through the switch 49, wire $w$, armature coil $w'$, switch 27, wire $w^3$, ring 39, through the connector bar 30, thence to ring 38, wires $w^{10}$ and $L^5$, and thus into the other main line $L^2$. This circuit will energize the coil $w'$ and cause the armature to lift, establishing engagements between terminal members $l'$ and $l^2$, $l^3$ and $l^4$, $l^6$ and $l^8$, $l^7$ and $l^9$. This action of the armature closes the motor circuit consisting of the lines $L^3$, $L^4$, $L^8$, and $L^7$, which results in the operation of the motor in what I shall call a "forward" direction, and such as will cause the drum to rotate to unwind the primary cable 7. Shortly after this occurs, the contact members $s$ and $l$ are disconnected and the switch coil circuit just described broken. However, inasmuch as members $l^8$ and $l^6$ are now in contact, another circuit through the switch coil $w'$ is established by means of the connections $l^6$ and $l^8$, so that the establishment of this magnetized field is maintained and the armature $a$ held in its closing position.

It should be remembered that during such forward rotation of the drum, however, as previously described, contacts 35—35 remain in engagement with bar 30 and contacts 34—34 out of engagement with bar 29.

When the cable tension is removed as a result of the arrest of the bar 8, the spring 47 is permitted to act and reverse the position of said contacts.

Such action breaks the circuit of armature $a$ as shown in dotted lines in Fig. 21, and said armature drops, breaking the previously described motor circuit. This occurs before the nut actuates limit switch 27 to open.

However, this action at the same time establishes a circuit through the coil $w^{15}$ and raises armature $a'$ to connect terminals $l^{11}$ and $l^{13}$, $l^{10}$ and $l^{12}$, $l^{15}$ and $l^{17}$, $l^{14}$ and $l^{16}$. This results in a reversal of the current through the motor, as will be readily seen from an inspection of Fig. 21, and a reversal of the direction of rotation of the motor. The drum will hence be rotated in the reverse direction, and wound up, thus raising the bar 8. Such reversal, however, counteracts the action of spring 47 and the original position of the member 31 is established. This breaks the circuit including the coil $w^{15}$, but by the engagement of contacts $l^{10}$ and $l^{12}$ establishes another circuit therethrough, including wires $w^9$, $w^{11}$, $w^{10}$ and $L^5$, thus maintaining the armature $a'$ in its raised position and permitting the motor to continue its reverse movement.

The latter continues until the bar 8 reaches its initial raised position or starting point, at which time the nut 19 engages roller 22 and opens the limit switch 24, thereby stopping the motor.

All of the above described actions take place during the time the rotating switch terminal $s$ is travelling in non-engagement with the terminal $l$. When a re-engagement of said terminals is effected, the above operations are repeated.

Having now described the mechanism and its operation in connection with the automatic lowering and raising of the indicator bar, I shall now describe the means employed to indicate the plane at which the said bar is arrested, the means for recording the successive indications and the manner of effecting the cooperation of the lowering and raising means with the indicating and recording mechanism.

The primary cable 7 before passing around the drum 6, passes around a sheave 50 suitably mounted in the stock house, and said sheave has secured to its shaft a drum 51. One end of a secondary cable 52 is wound upon the drum and passes over a guiding pulley 53 and then down to the lower part of the house and within easy ocular access of the observer.

The lower end portion of the cable is connected with the indicating device which is illustrated by Figs. 10 to 19 inclusive.

Said device includes a drum 54 around which such lower cable end portion passes and then depends, a suitable weight 55 being attached to its extremity.

Figure 12:
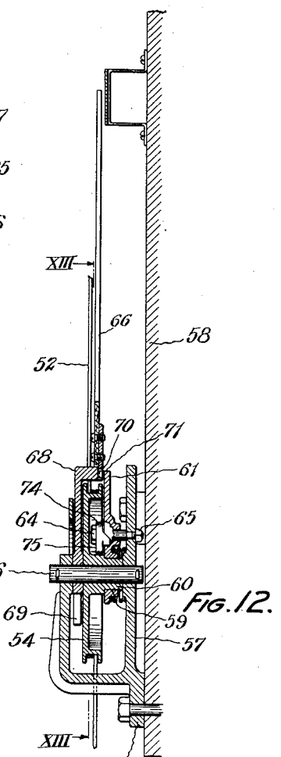
Fig. 12 represents a section taken upon the plane indicated by lines XII—XII, Fig. 10, and viewed in the direction indicated by the arrows.
Figure 13:
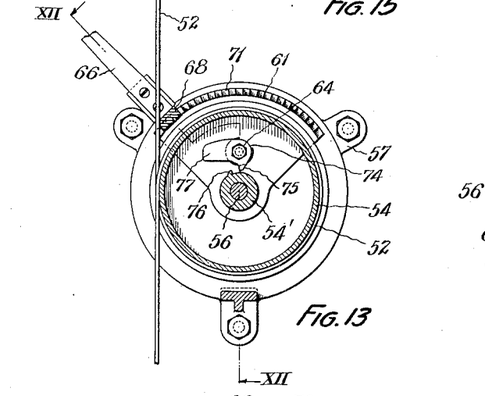
Fig. 13 represents a detail section taken upon the plane indicated by the line XIII—XIII in Fig. 12, and viewed in the direction indicated by the arrows.

This drum is rotatably mounted upon a pin 56 which is supported in a frame 57 which may be secured to a wall 58 of the house 2, as shown in Fig. 12.

The rear side of the drum is open and the drum's hub is extended therethrough to form a journal 59 for the bearing 60 of a segmental ratchet 61 which is urged against a shoulder 62 by a coiled spring 63, interposed between it and the frame 57.

The said ratchet is secured to frame 57 by means of a bolt 64 and nut 65.

Figures 10, 11:
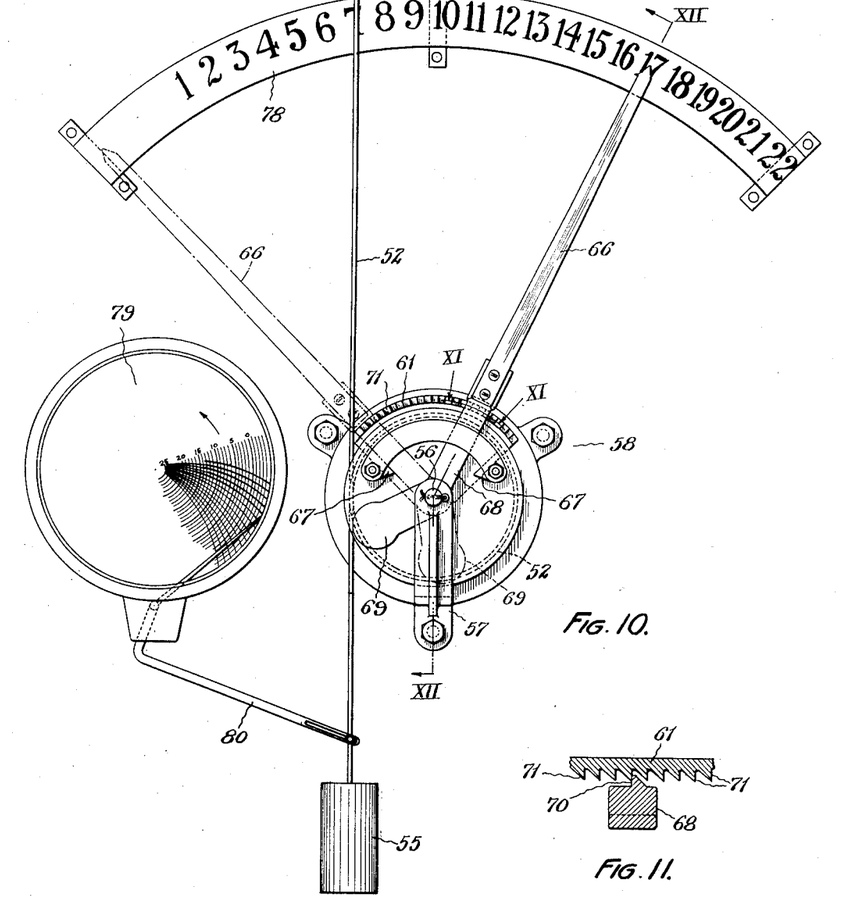
Fig. 10 represents a front elevation of a part of the indicating and recording mechanism.
Fig. 11 represents upon an enlarged scale a detail section taken upon the plane indicated by line XI—XI in Fig. 10.
Figure 15:
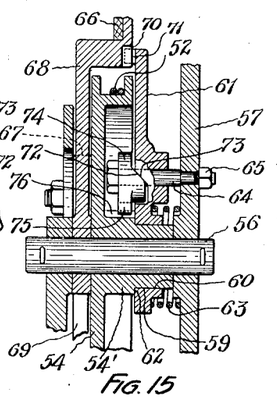
Fig. 15 represents a fragmentary section upon an enlarged scale taken upon the plane indicated by line XV—XV in Fig. 14 and viewed in the direction indicated by the arrows.
Figure 16:
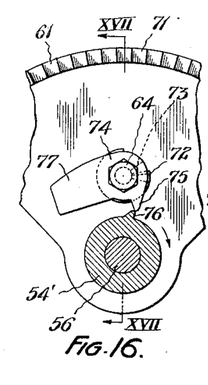
Fig. 16 represents a view similar to that of Fig. 14 showing the parts in a different position.
Figures 17, 18:
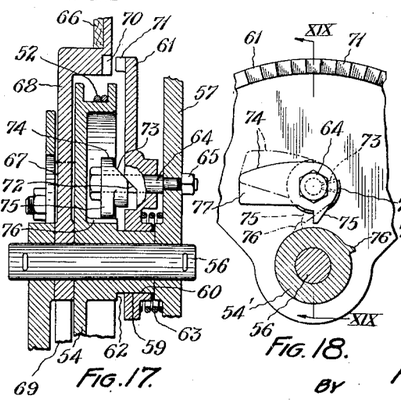
Fig. 17 represents a section taken upon the plane indicated by line XVII—XVII in Fig. 16 and viewed in the direction indicated by the arrows.
Fig. 18 represents a view similar to Figs. 14 and 16, and showing the parts in still another position.
Figure 19:
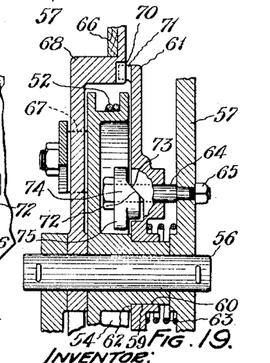
Fig. 19 represents a section taken upon the plane indicated by line XIX—XIX in Fig. 18, and viewed in the direction indicated by the arrows.

An indicator arm 66 is oscillatorily mounted upon the outer end portion of the pin 56, Fig. 15, and its oscillatory path is limited by two projections 67—67 on and preferably formed integrally with the front face of the drum, Fig. 10.

The lower end of this arm consists of a casting 68 provided with a depending weight 69.

The upper portion of the casting is provided with a tooth 70 which engages the teeth 71 of the ratchet 61.

Figure 14:
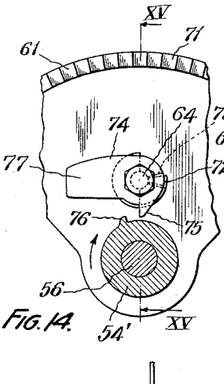

Formed in the front face of the body of said ratchet is a cam-surface 72 which is engaged by a cam-surface 73 formed upon a dog 74 which is oscillatorily mounted upon the bolt 64 as shown in Figs. 14 and 15. The dog has a nose 75 which lies in the path of movement of a lug 76 formed upon the upper side of the interior hub 54', and is also provided with a counterweight 77 which assists the spring 63 in maintaining the two cam surfaces 72 and 73 in contact.

The above described mechanism constitutes the indicating means and operates as follows:

Assuming again that the contact bar 8 is in its uppermost or initial position and that it is caused, in the manner previously described, to start upon and continue its downward travel, the cable 7 hence rotates the sheave 50 and the drum 51 which causes the secondary cable 52 to wind up and rotate the indicator drum 54 in the direction indicated by the curved arrow in Fig. 14. Such action causes the lug 76 to engage the nose 75 and tilt the dog and move cam surface 73 upon its axis and upon cam surface 72. This forces the ratchet member back releasing its teeth 71 from engagement with the tooth 70. This frees the indicator arm and it quickly moves over to the left (as viewed in Fig. 10) until it strikes the left-hand projection 67 as shown in dotted lines in Fig. 10. By this time, however, the lug 76 will have passed the nose 75 and the dog will have been released, whereupon the ratchet is moved over by the spring 63 until the ratchet teeth again are engaged by the tooth 70.

The continued rotation of the drum and consequent movement of the lug 67 due to the upward movement of the cable, thereupon carries the indicator arm to the right until the cable and drum stop as a result of the arrest of the contact bar 8.

The teeth 71 are inclined so as to allow of the passage thereover of the tooth 70, and hence hold the arm in its final position.

A dial 78, suitably calibrated, is provided adjacent to the end of the indicator arm 66 so that the location of the plane at which the said bar is stopped, may be read, as will be readily understood. When the cable 52 is lowered, the drum moves back to its original position, the arm remaining in its place.

The above-described operation of the indicating mechanism is repeated upon the occasion of each descent of the contact bar.

In order to make a permanent record of the successive readings, I provide a continuous recording device 79 whose recording arm is connected with the cable 52 by means of a lever 80, Fig. 10.

This recording mechanism may be of any well known and standard type, the details of whose construction need not hence be herein described.

In the ordinary and normal operation of the device, the limit switch 27 plays no part, and the nut, as previously described, does not actuate same. However, should the top of the charge in the furnace reach an abnormally low level and such as to cause the contact bar to emerge from its encasing and guiding tube, additional labor and trouble would be created by necessity of raising such bar up through said tube. To prevent this eventuality said limit switch 27 is so placed that before such a condition could be encountered, the nut 19 will have reached and actuated such switch to open the circuit and stop the motor, thus giving an indication of such abnormal conditions which may then be corrected, all as will be readily understood by those skilled in the art.

What I claim is:

1. In apparatus of the class described, the combination of a contact member; automatic means for lowering and raising said member at predetermined definite periods, and means connected with said automatic means for indicating the lowermost position of the contact member.

2. In apparatus for indicating the height of a variable factor, the combination of a contact member, a reversible electric motor, a connection between the motor and contact member to raise and lower the latter, an indicator operated by said connection, electric circuits for the motor, a continuously operating electric switch member adapted to periodically establish the motor circuit, and electrical contacts controlled by engagement of the contact member with the matter the height of which is to be measured, to reverse the current in the motor and raise the contact member.

3. In apparatus of the class described, the combination with a flexible cable, a contact member suspended therefrom; of means for periodically unwinding and winding said cable; the initiation of the winding of said cable being controlled by the tension therein.

4. In apparatus for determining the height of material, the combination of a contact member, a motor, connections between the contact member and motor to lower the contact member into engagement with the material, and means brought into operation by engagement of the contact member with the material to reverse the motor and raise the contact member to its initial position.

5. The combination specified in claim 4 with the addition of an indicating member controlled by the means for lowering the contact member to indicate its lowermost position.

6. The combination specified in claim 4 with the addition of a timing means to initiate the lowering movement of the contact member.

7. The combination specified in claim 4 with the addition of a timing means to initiate the lowering movement of the contact member, and an indicator controlled by the contact member lowering means to indicate the lowermost position of the contact member.

8. The combination specified in claim 4 in which the connection between the motor and contact member consists of a flexible cable.

9. In apparatus of the class described, the combination of a flexible cable, a contact member suspended therefrom; a drum to which said cable is connected; a motor for rotating said drum; means for automatically starting said motor to unwind said cable; means for automatically reversing said motor upon the arrest of the downward movement of said contact member; and means for automatically stopping said motor when said member reaches its upper starting point.

10. In apparatus of the class described, the combination of a flexible cable, a contact member suspended therefrom; a drum to which said cable is connected; a motor for rotating said drum; means for starting said motor to unwind said cable; means for automatically reversing said motor upon the arrest of the downward movement of said member resulting from such unwinding; means for automatically stopping said motor; and means for periodically and automatically effecting the operation of such starting means.

11. In apparatus of the class described, the combination of a flexible cable, a contact member suspended therefrom; a drum to which said cable is connected; an electric motor for rotating said drum; a rotating switch controlling the motor circuit whereby the drum is periodically started to rotate and unwind said cable; means for maintaining the closed motor circuit after the said switch is opened; means for automatically reversing said motor upon the arrest of the downward movement of said member; and means for automatically stopping said motor prior to the next closing operation of said switch.

12. In apparatus of the class described, the combination of an electric motor and circuits therefor for driving it in opposite directions; a drum connected with the motor shaft and having a cable attached thereto; a weight attached to said cable whereby the latter is kept normally in tension; electrical connections for completing one of said circuits and controlled by the tension in said cable; and electrical connections for completing the other of said circuits; and separate means for actuating said second-named connections and controlled by the removal of such tension.

13. In apparatus of the class described, the combination of an electric motor; a drum loosely mounted upon a shaft which is driven by said motor; a cable having one end portion wound upon said drum and the other end portion depending with a weight attached thereto, whereby said cable is normally in tension; two electrical contact members fixed with reference to said drum and upon opposite sides of its axis; a member fixed to said shaft having electrical contact members affixed thereto and upon opposite sides of said shaft, and adapted to engage said first-named contact members respectively; one pair of said members being capable of engagement while the other is out of engagement, such engagement being effected by the tension in the cable; and means for disconnecting said pair and effecting engagement of the other pair when such tension is removed.

14. In apparatus of the class described, the combination of an electric motor; a drum loosely mounted upon a shaft driven by said motor and having upon one face thereof two electrical connectors positioned upon opposite sides of the drum's axis; a member fixed to said shaft and having two pairs of electrical terminals adapted to engage said connectors respectively and so arranged that while one pair is out of contact with its connector, the other pair is in contact with its connector; and a spring having its ends connected with said drum and shaft respectively and tending to move said member so as to cause one of said pairs of terminals to engage and the other to disengage its connector.

15. In apparatus of the class described, the combination of a shaft; a drum loosely mounted upon said shaft; two shoulders upon opposite sides of the drum's axis; a member fixed to said shaft and capable of angular movement with relation to said drum limited by said shoulders; and a spring having one end connected with said drum and the other with said member.

16. In apparatus of the class described, the combination of a cable having a weight depending from one end thereof; means for unwinding and winding up said cable; means for indicating the plane of said weight and actuated by said cable, comprising an angularly movable pointer and a suitable dial therefor; means for releasing said pointer from its connection with said cable when the weight starts to descend; means for moving said pointer to an initial or starting position when so released; and means for reconnecting said cable and pointer after such initial release has been effected.

17. In apparatus of the class described, the combination of a primary cable having a weight depending from one end thereof; a primary drum for winding up and unwinding said cable; a pulley around which an intermediate part of said cable passes; a secondary drum; a secondary cable connected with the latter and arranged to be wound up by said drum when said weight descends; and a pointer actuated by said secondary cable to indicate the position of said weight.

18. In apparatus for indicating the height of material in a furnace, the combination of a contact member, automatic means independent of the charging mechanism of the furnace for raising and lowering said member at predetermined periods, and means connected with said automatic means for indicating the lowermost position of the contact member.

19. In apparatus for indicating the height of material, the combination of a contact member, means for lowering the contact member into engagement with the material, and means controlled by such engagement of the contact member and material for reversing the operation to raise the contact member.

Signed by me this 29th day of June, 1925.

HAKON A. BERG.